US011497664B2

(12) United States Patent
Childs et al.

(10) Patent No.: US 11,497,664 B2
(45) Date of Patent: Nov. 15, 2022

(54) SYSTEM AND METHOD OF BRAKING FOR A PATIENT SUPPORT APPARATUS

(71) Applicant: Stryker Corporation, Kalamazoo, MI (US)

(72) Inventors: William Dwight Childs, Plainwell, MI (US); Anish Paul, Portage, MI (US)

(73) Assignee: Stryker Corporation, Kalamazoo, MI (US)

( * ) Notice: Subject to any disclaimer, the term of this patent is extended or adjusted under 35 U.S.C. 154(b) by 26 days.

(21) Appl. No.: 17/165,210

(22) Filed: Feb. 2, 2021

(65) Prior Publication Data
US 2021/0154062 A1 May 27, 2021

Related U.S. Application Data

(63) Continuation of application No. 15/201,689, filed on Jul. 5, 2016, now Pat. No. 10,912,685.
(Continued)

(51) Int. Cl.
*A61G 1/02* (2006.01)
*B60T 1/06* (2006.01)
(Continued)

(52) U.S. Cl.
CPC ......... *A61G 1/0287* (2013.01); *A61G 1/0231* (2013.01); *A61G 1/0237* (2013.01);
(Continued)

(58) Field of Classification Search
CPC .. A61G 1/0231; A61G 1/0237; A61G 1/0275; A61G 1/0287
See application file for complete search history.

(56) References Cited

U.S. PATENT DOCUMENTS

| 3,380,546 A | 4/1968 | Rabjohn |
| 4,811,988 A | 3/1989 | Immel |

(Continued)

FOREIGN PATENT DOCUMENTS

| CA | 2010543 A1 | 9/1990 |
| DE | 4319516 A1 | 12/1994 |

(Continued)

*Primary Examiner* — Erez Gurari
(74) *Attorney, Agent, or Firm* — Warner Norcross + Judd LLP

(57) ABSTRACT

A patient support apparatus includes a base having a length and including a plurality of caster wheels enabling movement of the patient support apparatus across a floor surface. An auxiliary wheel support structure is secured to the base and rotatably supports at least one non-castered auxiliary wheel. A drive mechanism including a motor may be configured to drive the auxiliary wheel. A braking system including at least one brake member may be configured to apply a braking force to decelerate the auxiliary wheel and is movable between a first position wherein the at least one brake member is disengaged from the auxiliary wheel and a deployed position wherein the at least one brake member is frictionally engaged with the auxiliary wheel to restrict rotation of the auxiliary wheel. The braking system may be configured to synchronize the braking forces applied to first and second auxiliary wheels.

17 Claims, 5 Drawing Sheets

Related U.S. Application Data

(60) Provisional application No. 62/196,396, filed on Jul. 24, 2015.

(51) Int. Cl.
   *B60T 1/08* (2006.01)
   *B60T 7/06* (2006.01)
   *B60T 7/10* (2006.01)
   *B60T 7/22* (2006.01)
   *B60T 11/04* (2006.01)
   *F16D 125/60* (2012.01)

(52) U.S. Cl.
   CPC ............ *A61G 1/0275* (2013.01); *B60T 1/065* (2013.01); *B60T 1/08* (2013.01); *B60T 7/06* (2013.01); *B60T 7/102* (2013.01); *B60T 7/22* (2013.01); *B60T 11/046* (2013.01); *B60T 2201/022* (2013.01); *F16D 2125/60* (2013.01)

(56) References Cited

U.S. PATENT DOCUMENTS

| | | |
|---|---|---|
| 5,083,625 A | 1/1992 | Bleicher |
| 6,173,799 B1 | 1/2001 | Miyazaki et al. |
| 6,230,343 B1 | 5/2001 | Buiskool et al. |
| 6,240,579 B1 | 6/2001 | Hanson et al. |
| 6,256,812 B1 | 7/2001 | Bartow et al. |
| 6,264,006 B1 | 7/2001 | Hanson et al. |
| 6,330,926 B1 | 12/2001 | Heimbrock et al. |
| 6,505,359 B2 | 1/2003 | Heimbrock et al. |
| 6,725,956 B1 | 4/2004 | Lemire |
| 6,729,421 B1 | 5/2004 | Gluck et al. |
| 6,745,859 B2 | 6/2004 | Simons et al. |
| 6,752,224 B2 | 6/2004 | Hopper et al. |
| 6,772,850 B1 | 8/2004 | Waters et al. |
| 6,792,630 B1 | 9/2004 | Palmatier et al. |
| 6,951,034 B2 | 10/2005 | Shiery et al. |
| 7,007,765 B2 | 3/2006 | Waters et al. |
| 7,062,805 B2 | 6/2006 | Hopper et al. |
| 7,090,041 B2 | 8/2006 | Vogel et al. |
| 7,124,456 B2 | 10/2006 | Palmatier et al. |
| 7,273,115 B2 | 9/2007 | Kummer et al. |
| 7,346,942 B2 | 3/2008 | Reinke et al. |
| 7,395,564 B2 | 7/2008 | McDaniel et al. |
| 7,530,412 B2 | 5/2009 | Heimbrock et al. |
| 7,562,883 B2 | 7/2009 | Livengood et al. |
| 7,690,057 B2 | 4/2010 | Malassigne et al. |
| 7,793,744 B1 | 9/2010 | Hardie |
| 7,828,092 B2 | 11/2010 | Vogel et al. |
| 7,882,582 B2 | 2/2011 | Kappeler et al. |
| 7,886,377 B2 | 2/2011 | Hamberg et al. |
| 7,905,304 B2 | 3/2011 | Adachi |
| 7,953,537 B2 | 5/2011 | Bhai |
| 8,096,005 B2 | 1/2012 | Carletti et al. |
| 8,196,237 B2 | 6/2012 | Herbst et al. |
| 8,442,738 B2 | 5/2013 | Patmore |
| 8,613,455 B2 | 12/2013 | Berrett et al. |
| 8,701,229 B2 | 4/2014 | Lemire et al. |
| 8,720,616 B2 | 5/2014 | Kofoed et al. |
| 8,781,677 B2 | 7/2014 | Roberts et al. |
| 8,950,522 B1 | 2/2015 | Lenkman |
| 9,707,143 B2 | 7/2017 | Thodupunuri et al. |
| 9,833,366 B2 | 12/2017 | DeLuca et al. |
| 9,986,731 B2 | 6/2018 | Mitchell et al. |
| 10,912,685 B2* | 2/2021 | Childs .................. A61G 1/0275 |
| 2003/0159861 A1* | 8/2003 | Hopper ................ A61G 1/0268 180/22 |
| 2004/0084864 A1 | 5/2004 | Casey et al. |
| 2005/0057010 A1* | 3/2005 | Hopper ................ A61G 7/0528 280/47.16 |
| 2007/0170673 A1* | 7/2007 | Figel .................... B60B 33/021 280/47.34 |
| 2008/0301875 A1 | 12/2008 | Malassigne et al. |
| 2009/0001740 A1 | 1/2009 | Kofoed et al. |
| 2010/0283314 A1* | 11/2010 | Lubbers ................ A61G 7/05 303/9.61 |
| 2011/0225733 A1* | 9/2011 | Figel .................... A61G 1/0268 5/611 |
| 2012/0000718 A1 | 1/2012 | Berrett et al. |
| 2012/0298459 A1 | 11/2012 | Lubbers et al. |
| 2017/0020752 A1* | 1/2017 | Childs ...................... B60T 7/22 |
| 2018/0168897 A1 | 6/2018 | Jönsson |
| 2018/0250178 A1* | 9/2018 | Paul .................. A61G 7/0528 |
| 2019/0201255 A1* | 7/2019 | Paul .................. A61G 5/1005 |
| 2019/0201256 A1* | 7/2019 | Derenne .............. A61G 7/0528 |
| 2019/0298590 A1* | 10/2019 | Patmore ............... A61G 1/0268 |
| 2021/0154061 A1* | 5/2021 | Phan ........................ A61G 7/08 |
| 2021/0154062 A1* | 5/2021 | Childs .................. A61G 1/0275 |

FOREIGN PATENT DOCUMENTS

| | | |
|---|---|---|
| DE | 4319525 A1 | 12/1994 |
| JP | 48-44792-01 | 9/1971 |
| JP | 48-44793-01 | 9/1971 |
| JP | 48-54494-01 | 10/1971 |
| JP | 48-54495-01 | 10/1971 |
| JP | 60-122561 A | 7/1985 |

* cited by examiner

SYSTEM AND METHOD OF BRAKING FOR A PATIENT SUPPORT APPARATUS

CROSS REFERENCE TO RELATED APPLICATIONS

This application is a continuation application of U.S. Ser. No. 15/201,689, filed Jul. 5, 2016, entitled SYSTEM AND METHOD OF BRAKING FOR A PATIENT SUPPORT APPARATUS, which claims the benefit of U.S. Prov. App. No. 62/196,396 filed Jul. 24, 2015, entitled SYSTEM AND METHOD OF BRAKING FOR A PATIENT SUPPORT APPARATUS, which are incorporated by reference herein in their entireties.

TECHNICAL FIELD

The present disclosure relates to a patient support apparatus for supporting a patient, and, more particularly, to a system and method for dynamically braking a patient support apparatus.

BACKGROUND

Patient support apparatus comprise complex mechanical and electronic components for movement, functionality and convenience. Often, the operator directs movement of the patient support apparatus from the head-end by pushing on the head-end or push handles located at the head-end.

Many patient support apparatuses include a fifth wheel which is raised and lowered by an attendant by directly manually manipulating the wheel support frame oriented beneath the patient supporting portion of the patient support apparatus. The fifth wheel is positioned at substantially the center of the patient support apparatus such that usually the rear castered wheels and the fifth wheel engage the floor surface and support the patient support apparatus while the front castered wheels are raised when the fifth wheel is deployed. A drive mechanism may be coupled to the fifth wheel to assist in the moving and steering of the patient support apparatus.

Braking systems may be used to safely maneuver and park the hospital patient support apparatus during patient transport. It would be advantageous to provide a braking system that allows for greater control of the movement and positioning of the patient support apparatus while creating supplemental charging options for the hospital patient support apparatus's batteries and electrical storage units. Therefore, there is a need to provide a patient support apparatus which overcomes the limitations of the prior art.

SUMMARY

In one embodiment, a patient support apparatus for supporting a patient includes a base having a length and, further, a plurality of caster wheels enabling movement of the patient support apparatus across a floor surface. A support structure may be secured to the base and configured to rotatably support at least one non-castered auxiliary wheel about an axis transverse to the length of the base for engagement with the floor surface. The patient support further includes a braking system to apply a braking force to the at least one auxiliary wheel.

In one aspect, the braking system includes at least one brake member that is configured to apply a braking force to the at least one auxiliary wheel.

Further, the at least one brake member is movable between a first position wherein the at least one brake member is disengaged from the auxiliary wheel and a deployed position wherein the at least one brake member is frictionally engaged with the auxiliary wheel to restrict rotation of the auxiliary wheel.

For example, the brake member may comprise a caliper operable to frictionally engaged a disc provided with the at least one auxiliary wheel to thereby brake the at least one auxiliary wheel.

In another aspect, the auxiliary wheel comprises a first auxiliary wheel and a second auxiliary wheel spaced apart from the first auxiliary wheel. A shaft extends between and rotatably connects the first and second auxiliary wheels.

In a further aspect, the braking system selectively limits rotation of the auxiliary wheel by frictionally engaging the shaft extending between and connecting the first and second auxiliary wheels.

In another embodiment, the braking system includes a clutch to selectively couple or decouple the shafts of the first and second auxiliary wheel together.

In yet another embodiment, the auxiliary wheels are each mounted about a shaft and the braking system includes a differential rotatable joining the shafts, and the braking system selectively applying a torque to the differential to apply a braking force to the auxiliary wheels.

The braking system of the patient support apparatus may further be adapted to synchronize the braking forces applied to the first and second auxiliary wheels.

In one embodiment, a drive mechanism may include a motor configured to drive the auxiliary wheel. The braking system limits rotation of the auxiliary wheel by frictionally engaging the drive mechanism to brake the auxiliary wheel.

In one embodiment, the auxiliary wheel is mounted to the base independently of each of the caster wheels. The plurality of caster wheels comprises four caster wheels spaced from one another on the base that engage the floor surface. The plurality of caster wheels include a head end caster wheel and a foot end caster wheel, each caster wheel having a caster wheel axis of rotation and a swivel axis, and the auxiliary wheel being located between the axes of rotation of the head end caster wheel and the foot end caster wheel.

In another embodiment, the brake system comprises a hydraulic brake system.

In yet another embodiment, the braking system includes a clutch, including a mechanically driven clutch, an electrically driven clutch, or a hydraulically driven clutch, to synchronize the braking forces applied to the auxiliary wheels.

In still another embodiment, the braking system includes a caliper to brake one of the auxiliary wheels, and the clutch selectively applying the braking force from the one of the auxiliary wheels to the other of the auxiliary wheels.

A control system for controlling the braking system may be configured to modulate the braking force to the auxiliary wheel or wheels. The braking system may include an on or off state.

In another embodiment, the braking system includes a brake-on state and is actuated to release the braking force or forces or has a normally unbraked state and is actuated to apply the braking force or forces.

In one aspect, at least one sensor is in electrical communication with the control system and detects the condition of the at least one brake member. The controller selectively actuates the braking system based on input from the sensor.

In another embodiment, the at least one sensor detects the presence of a person, and the control system actuates the braking system when the sensor detects the presence of the person.

The patient support apparatus may further include a manually operable control, such as a handle or a pedal, mounted on the patient support apparatus. The braking system may be coupled to the manually operable control, for example, by a link or cable, for manual activation of the braking system.

In another embodiment, the braking system includes a motor for driving the auxiliary wheel and a controller, the controller configured to use back EMF from the motor to brake the auxiliary wheel. It is contemplated that the braking system is actuated by a mechanical control, an electrical control or a hydraulic control.

In another embodiment, a patient support apparatus comprises a base having a length and including a plurality of caster wheels enabling movement of the patient support apparatus across a floor surface. An auxiliary wheel includes a first auxiliary wheel, a second auxiliary wheel spaced apart from the first auxiliary wheel, and a shaft extending between and rotatably connecting the first and second auxiliary wheels, which is rotatably supported by a support structure secured to the base. A drive mechanism including a motor may be configured to drive at least one of the auxiliary wheels. The apparatus further includes a braking system to apply a braking force to decelerate the auxiliary wheels. In addition, the braking system is adapted to synchronize the braking forces applied to the first and second auxiliary wheels.

In one aspect, the braking system includes at least one brake member configured to apply a braking force to the auxiliary wheel. The at least one brake member is movable between a first position wherein the at least one brake member is disengaged from the auxiliary wheel and a deployed position wherein the at least one brake member is frictionally engaged with the auxiliary wheel to restrict rotation of the auxiliary wheel.

In one aspect, the brake system comprises a hydraulic brake system.

In yet another aspect, the braking system includes a clutch, including a mechanically driven clutch, an electrically driven clutch, or a hydraulically driven clutch, to synchronize the braking forces applied to the auxiliary wheels. The braking system may include a caliper to brake one of the auxiliary wheels, and the clutch selectively applying the braking force from the one of the auxiliary wheels to the other of the auxiliary wheels.

A control system controlling the braking system modulates the braking force to the auxiliary wheels and selectively actuating the braking system based on input from at least one sensor. For example, the sensor may detect the presence of a person, and the control system actuates the braking system when the sensor detects the presence of the person.

In another embodiment, the braking system includes a motor for driving the auxiliary wheels and a controller, the controller configured to use back EMF from the motor to brake the auxiliary wheels.

In yet another embodiment, the braking system includes a differential rotatable joining the shafts, and the braking system selectively applies a torque to the differential to apply a braking force to the auxiliary wheels.

In another embodiment, a method of controlling the braking of a patient support apparatus includes providing a base, a support structure secured to the base configured to rotatably support an auxiliary wheel, and a braking system having at least one brake member configured to apply a braking force to decelerate the auxiliary wheel. A controller may be operatively connected to the at least one brake member may be configured to modulate the braking force applied to the auxiliary wheel.

The controller selectively actuates the at least one brake member based on input from at least one sensor in electrical communication with the controller. It is understood that the controller may actuate the at least one brake member in response to input from sensors at the handles of the patient support apparatus or control commands electrically communicated to the controller from the control apparatus provided on the patient support apparatus.

In another aspect, the controller monitors input from the at least one sensor and synchronizes the braking force applied to first and second auxiliary wheels. The at least one sensor monitors when the at least one brake member is frictionally engaged with at least one of the auxiliary wheels to restrict rotation of the auxiliary wheels to provide the input to controller.

In one embodiment, the step of selectively actuating the at least one brake member further comprises detecting presence of a person with the at least one sensor to actuate the at least one brake of braking system when the sensor detects the presence of the person.

In another embodiment, the step of selectively actuating the at least one brake member further comprises the step of moving the at least one brake member between a first position wherein the at least one brake member is disengaged from the auxiliary wheel and a deployed position wherein the at least one brake member is frictionally engaged with the auxiliary wheel to restrict rotation of the auxiliary wheel.

In yet another embodiment, the step of selectively braking rotation of the auxiliary wheel includes frictionally engaging at least one shaft extending between and rotatably connecting first and second auxiliary wheels.

In another embodiment, the step of selectively braking includes coupling or decoupling the shafts of the first and second auxiliary wheels together with the at least one brake member.

In yet another embodiment, the step of selectively braking includes applying a torque to a differential rotatably joined to the shaft to apply the braking force to the auxiliary wheel.

DETAILED DESCRIPTION

Figure 1:
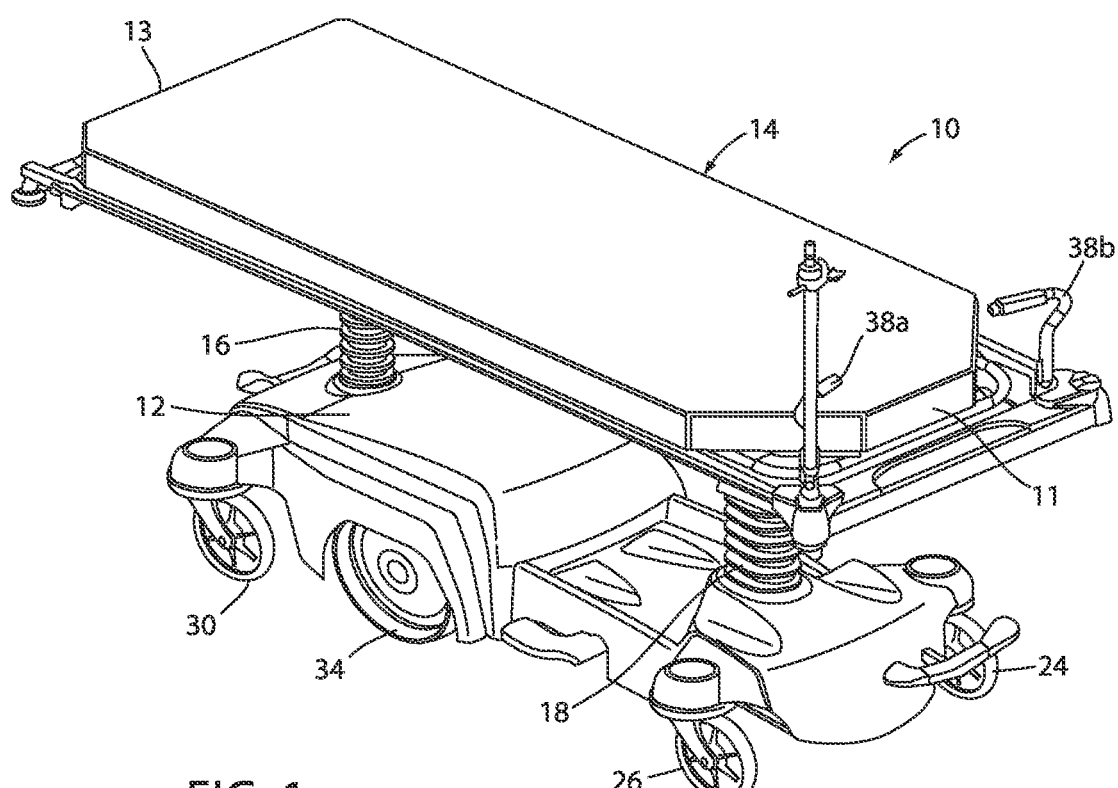
FIG. 1 is a perspective view of a patient support apparatus for supporting a patient in a substantially horizontal position.

With references to the Figures, a more detailed description of embodiments of a patient support apparatus will be described. For ease of illustration and to facilitate understanding, throughout the following description similar reference numerals have been used to denote similar elements, parts, items or features in the drawings, where applicable.

Certain terminology will be used in the following description for convenience in reference only and will not be limiting. The words "up", "down", "right" and "left" will designate directions in the drawings to which reference is made. The words "in" and "out" will refer to directions toward and away from, respectively, the geometric center of the patient support apparatus and designated parts thereof. Such terminology will include derivatives and words of similar importance.

Figure 2:
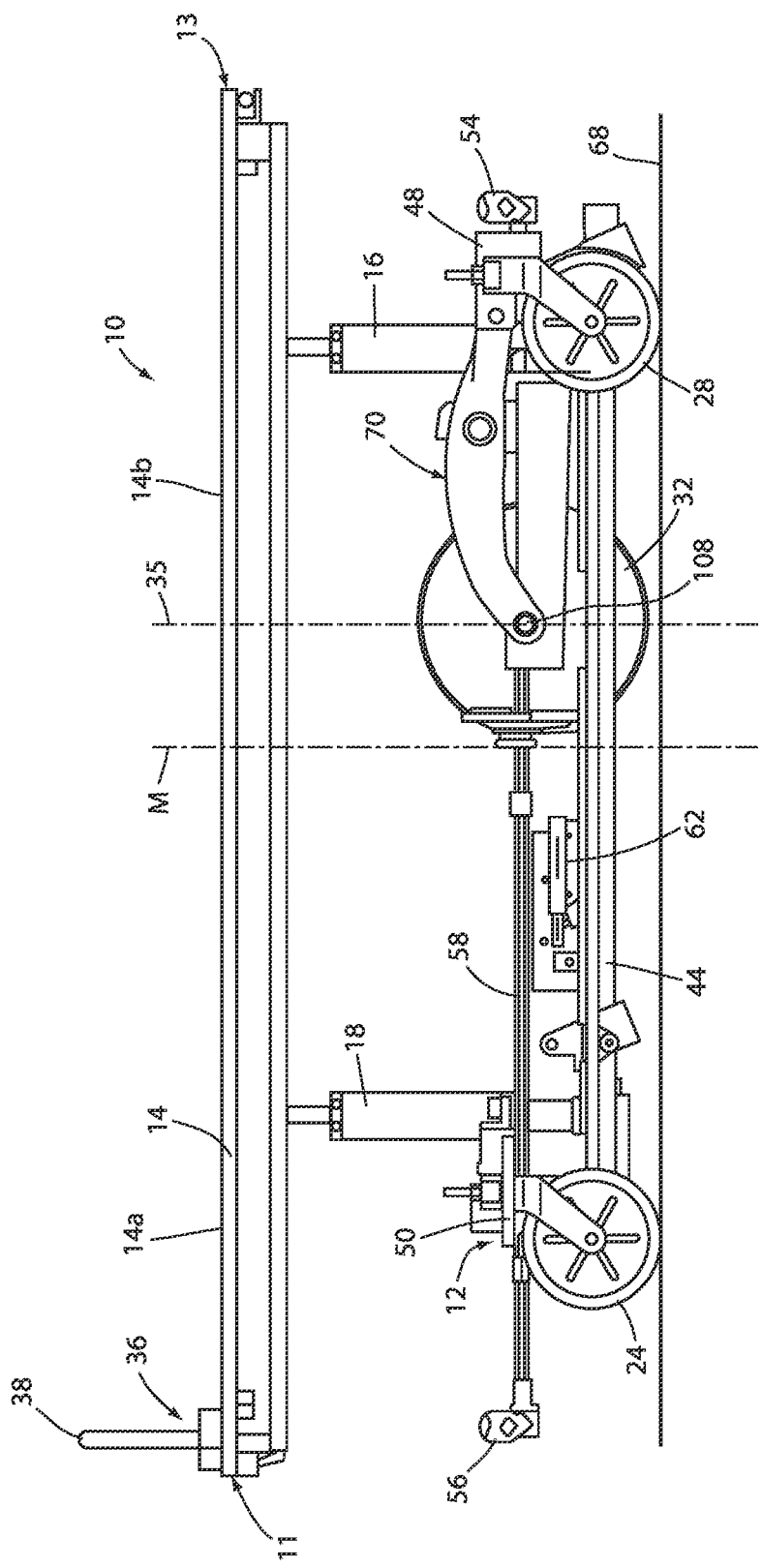
FIG. 2 is a side view of the patient support apparatus for supporting a patient in a substantially horizontal position.

Referring to FIG. 1, a patient support apparatus 10 for supporting a patient is illustrated. Patient support apparatus 10 may comprise a stretcher, a hospital bed, a chair, such as a wheel chair or medical recliner chair, or a cot. The patient support apparatus 10 includes a wheeled base 12 and patient support 14, which may include at least a back section 14a and a seat section 14b, as illustrated in FIG. 2. Optionally, patient support 14 includes a back section pivotally joined with the seat section to form an articulating patient support deck. Optionally, depending on the form of the apparatus, apparatus 10 may also include an elevation system operatively coupled to the base configured to raise and lower the patient support relative to the base.

In one embodiment, the patient elevation system includes a pair of actuators, such as hydraulically operated jacks 16 and 18 interposed between the base 12 and the underside of the patient support 14. Examples of suitable jacks are disclosed in U.S. Pat. No. 6,752,224, which is commonly owned by Stryker Corporation of Kalamazoo and which is incorporated by reference in its entirety herein.

For the purpose of this description, patient support apparatus 10 includes a head end 11 and an opposing foot end 13 defining the ends of the patient support apparatus 10, and right and left sides joining these ends. The hydraulic jacks 16 and 18 are mounted to wheeled base 12 and provide height adjustable support for the patient support 14.

As shown additionally in FIG. 2, the base 12 is formed from spaced apart first and second elongate base frame members 44 that extend along the length of the patient support apparatus 10, which support a plurality of castered wheels 24, 26, 28, and 30. Wheels 24, 26, 28, and 30 form head end caster wheels and foot end caster wheels. Further, each caster wheel includes a caster wheel axis of rotation and a swivel axis.

Further, apparatus 10 includes one or more non-castered auxiliary wheels 32, 34 that may be powered or non-powered wheels, to facilitate movement of the patient support apparatus. The at least one auxiliary wheel may be located between the axes of rotation of the head end caster wheels and the foot end caster wheels of the patient support apparatus. In one embodiment, the powered version of the auxiliary wheels may be controlled by the ZOOM drive system, sold by Stryker Corporation and which is described in U.S. Pat. Nos. 6,772,850 and 7,007,765, which are commonly owned by Stryker Corporation of Kalamazoo and which are incorporated by reference in their entireties herein.

Further, the caster swivel axes defining a foot print. The at least one auxiliary wheel may be located inside or outside the foot print. For example, the at least one auxiliary wheel may be located beyond the swivel axes of the foot end or head end caster wheels.

Base 12 may include a pair of elongate base support beams 48, 50 that are supported by frame members 44 and provide a mount for wheels 24, 26, 28, and 30. For an example of a suitable construction reference is made to U.S. Pat. Nos. 6,240,579; 6,752,224; 6,792,630; and 6,951,034, which are commonly owned by Stryker Corporation of Kalamazoo and which are incorporated by reference in their entireties herein.

Auxiliary wheels 32, 34 are also supported by frame members 44, as will be more fully described below. Alternately, as shown in the illustrated embodiment, two of the castered wheels may be supported on one beam, either the foot end beam 48 or head end beam 50, and the other two caster wheels are commonly mounted with auxiliary wheel 32, 34 to base frame members 44. It should be understood that a single castered wheel may be commonly mounted to the auxiliary wheel or wheels where patient support apparatus 10 includes only a single castered wheel on either the foot end or head end of the apparatus.

Figure 3:
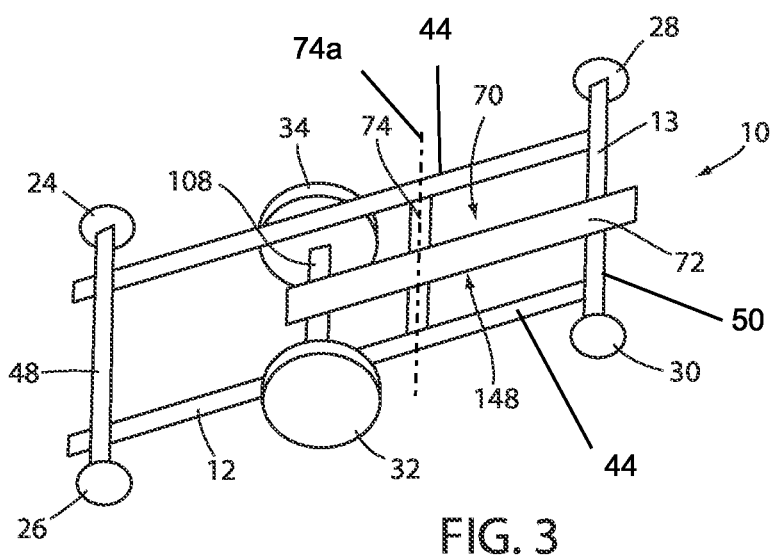
FIG. 3 is a perspective view of the base frame assembly, showing attachment of a further drive wheel system thereto.

Referring to FIG. 3, the at least one auxiliary wheel and its associated caster wheel or wheels are commonly mounted on an auxiliary wheel support structure 70. The auxiliary wheel support structure 70 comprises a beam 72 that is mounted to the base by an articulating mount 74. Mount 74 allows the ends of the beam 72 (and hence e.g. wheels 32, 34 and 28, 30) to pivot about a horizontal axis 74a so that when apparatus 10 is driven over a transition, such as between a slope and a horizontal plane, over thresholds, or other floor variations, both the auxiliary wheel(s) and its associated castered wheel(s) will maintain contact with the floor. The auxiliary wheel can be mounted to beam 72 at the same distance from the articulating mount as its associated caster wheel or wheels or at a distance greater or less than its associated castered wheel, which will vary the pressure applied to the floor by the respective wheels. For further details of the auxiliary support structure reference is made to articulating U.S. Patent Application No. 62/196,396, filed Jul. 24, 2015 and titled PATIENT SUPPORT APPARATUS, which is commonly owned by Stryker Corporation of Kalamazoo and which is incorporated by reference in its entirety herein.

In one embodiment, braking is achieved by braking the auxiliary wheel or wheels, which will be more fully described below in reference to FIGS. 4-8. In another embodiment, the apparatus includes brakes for the castered wheels 24, 26, 28, and 30.

Auxiliary wheels 32, 34 may be longitudinally spaced from the center of gravity along the length of the patient support apparatus 10, and each wheel 32, 34 laterally spaced from the central longitudinal axis of the patient support apparatus 10. As shown in FIG. 2, the base 12 has a transverse centerline M located at a midpoint of the length of the base and dividing the base. The axis 35 of the at least one auxiliary wheel 32 may be spaced from the centerline M at the midpoint of the base 12 toward the foot end 13 of the base. As detailed more fully below, one or more brake members may be provided at one or both of the auxiliary wheels to assist in the control of the patient support apparatus during transport.

Referring to FIGS. 4-7, one or more embodiments of the system and method of braking for use with a patient support apparatus are illustrated and disclosed. As will be described in greater detail below, the brake function may be synchronized such that brake force is applied to each of first and second wheels for the same amount of time with an identical force. This will assure that the apparatus will brake in a straight line. Alternatively, the brake force may be modulated to allow an operator to control the steering and braking of the patient support apparatus to effect a turn, if needed.

Figure 4:
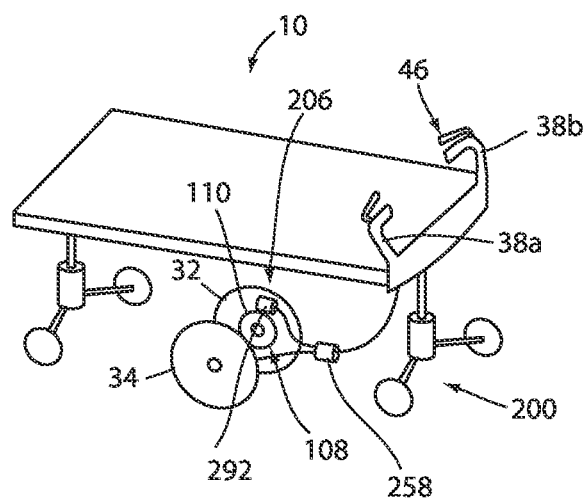
FIG. 4 is a perspective view of the patient support apparatus showing the at least one braking system.

In one embodiment, a dynamic braking system 200, illustrated in FIG. 4, includes one or more members cooperating with the at least one auxiliary wheel 32, 34 to assist with movement, steering and braking functions of the patient support apparatus. At least one brake member 206 of braking system 200 may be movable between a first position wherein the at least one brake member 206 is disengaged from the auxiliary wheel and a deployed position wherein the at least one brake member is frictionally engaged with the auxiliary wheel to restrict rotation of the auxiliary wheel. It is understood, as described below, that the at least one brake member may engage: One or more auxiliary wheels, a disc associated with one or more auxiliary wheels, a drive axle rotatably connected to the one or more auxiliary wheels, the drive motor or other combinations and permutations of the braking and drive systems.

In the illustrated embodiment, wheels 32 and 34 are commonly mounted to a drive axle 108 (FIG. 3). Braking system 200 may be in communication with a controller and power source described more fully below. Braking member 206 will engage the drive axle 108 and/or the corresponding auxiliary wheels 32, 34 in response to a control signal to slow movement or provide steering function for the patient support apparatus.

As best seen in FIG. 4, a disc 110 may be mounted to each auxiliary wheel about the drive axle 108 so that it rotates with wheels and axle about the axle's rotational axis. The auxiliary wheels may be braked by applying an equal brake force to the discs so that both auxiliary wheels are simultaneously braked. In the illustrated embodiment, the braking force is applied by one or more brake members 206, such as brake pads 292, which may be controlled by a controller or instead by manually operable force transmitting devices, such as by the handles described below.

Handles 38a, 38b may be operably connected to the brake actuator and brake pads 292, for example, by way of manually operable force transmitting devices, such as cables, including Boden cables. It is understood that the handles 38a, 38b may be operatively connected to a brake member, such as brake pads 292, through a variety of mechanical or electromechanical devices. For example, handles 38a, 38b may have mechanical controls 46, such as lever arms, that are linked to the force transmitting devices so that application of force to the controls 46 will cause the brake pads 292 to apply a force to the disc 110 on drive axle 108 to thereby brake auxiliary wheels 32, 34.

Therefore, it should be understood that the at least one auxiliary wheel may include a disc and a braking member operable to frictionally engage the disc to thereby brake the at least one auxiliary wheel.

In yet another embodiment, the braking system includes a clutch, including a mechanically driven clutch, an electrically driven clutch, or a hydraulically driven clutch, to synchronize the braking forces applied to the auxiliary wheels.

Figure 5:
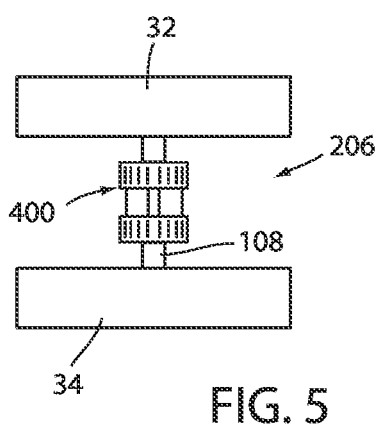
FIG. 5 is a schematic view of a mechanical clutch pack arrangement for use with one embodiment of the at least one braking system.

As shown in FIG. 5, each auxiliary wheel is mounted to a respective shaft or axle 108. An electromechanical clutch pack 400 is operably connected to each drive axle 108 corresponding to the first and second auxiliary wheels 32, 34. The synchronization and modulation of the braking system is controlled through manipulation of the clutch pack arrangement. It is understood that a separate control to release the brake may also be provided. In operation, the braking system uses a clutch to selectively couple or decouple the shafts of the first and second auxiliary wheel together.

In another embodiment, the braking system may include a caliper to brake one of the auxiliary wheels such that the clutch selectively applies the braking force from the one of the auxiliary wheels to the other of the auxiliary wheels. The caliper squeezes, for example, a brake pad or pads against a disc or other rotary member, which is mounted on the wheel and rotate with the wheel, for example, mounted about the wheel axle that supports the wheel. In this manner, when the caliper is actuated to apply a braking force, the brake pads squeeze and frictionally engage the disc or rotary member mounted about the wheel axle to thereby brake the wheel.

Figure 6:
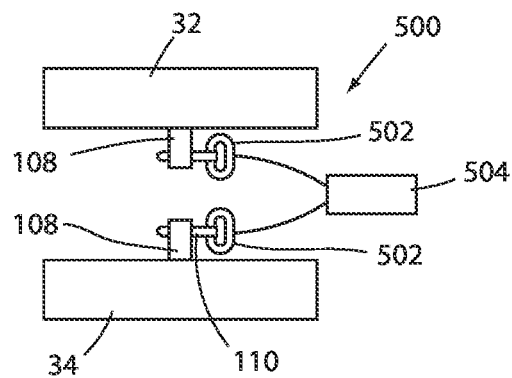
FIG. 6 is a schematic view of a hydraulic arrangement for use with one embodiment of the at least one braking system.

In another embodiment illustrated in FIG. 6, braking system selectively limits rotation of the auxiliary wheel by frictionally engaging the axles extending from the respective first and second auxiliary wheels. For example, a closed loop hydraulic brake system 500 is implemented with the first and second auxiliary heels 32, 34. Hydraulic brake system 500 includes braking members 502 operably engaging drive axles 108 of each of the first and second auxiliary wheels 32, 34. The braking members in fluid connection with controller 504 can be manipulated to synchronize or modulate the braking of the first and second auxiliary wheels in response to input received from handles, foot pedal or the control unit.

The one or more brake members may be electrical, hydraulic or mechanical in construction. For example, a set of calipers with brake pads may be configured to be positioned and engage corresponding discs 110 mounted to the respective shafts.

Figure 7:
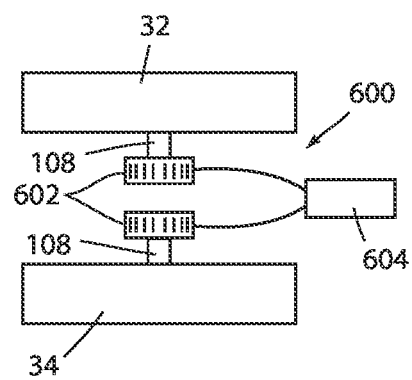
FIG. 7 is a schematic view of an electromechanical arrangement for use with one embodiment of the at least one braking system.

In another embodiment shown in FIG. 7, an electrical braking system is implemented to control the steering and braking functions of the patient support apparatus 10. The electrical braking system 600 includes one or more motors 602, such as a DC motor or the like, in electrical communication with a controller 604 that receives input from handles, a control unit or the like. Motors 602 cooperate with auxiliary wheels 32, 34 and/or drive axle 108 to decelerate the velocity of wheels 32, 34 of patient support apparatus. The one or more motors 602 drive the at least one auxiliary wheel such that the controller 604 may be configured to use back EMF from the motors 602 to brake the at least one auxiliary wheel 32, 34. Another suitable braking system is disclosed in U.S. Pat. App. No. 62/053,498, entitled PERSON SUPPORT APPARATUS, which is commonly owned by Stryker Corporation of Kalamazoo and which is incorporated by reference in its entirety herein.

Figure 8:
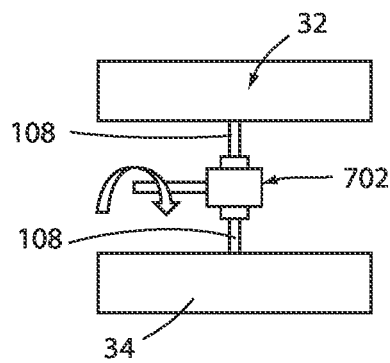
FIG. 8 is schematic view of a differential for use with one embodiment of the at least one braking system.

Referring to FIG. 8, the auxiliary wheels are each mounted about a shaft or axle 108. The braking system includes a differential 702 rotatably joining the shafts, and the braking system selectively applying a torque to the differential to apply a braking force to the auxiliary wheels. For example, the torque may be applied by a disc/caliper arrangement, a clutch arrangement, or by a motor as described above.

A manually operable control apparatus, such as a handle or a pedal, as described above, may be mounted to the patient support apparatus and coupled to the braking system, for example, by a link or cable, to manually activate the braking system. For example, a manually operable control apparatus for controlling one or more of the mechanically actuated brakes may include manually engaged members, such as foot pedals 54, 56, illustrated in FIG. 2, provided at opposing ends of a rotatable shaft 58, which is rotatably mounted to the base 12. The shaft may be coupled to linkage or cables to thereby actuate the manually operable brake members described above. The pedals 54, 56 can set a brake and/or control engagement of the auxiliary wheels 32, 34. One or more side pedals 60 can also set a brake or adjust the position of the auxiliary wheels 32, 34. The pedal arrangement has some similarities to the arrangement set forth in U.S. Pat. No. 6,240,579, issued Jun. 5, 2001 and titled UNITARY PEDAL CONTROL OF BRAKE AND FIFTH WHEEL DEPLOYMENT VIA SIDE AND END ARTICULATION WITH ADDITIONAL UNITARY PEDAL CONTROL OF HEIGHT OF PATIENT SUPPORT, which is hereby incorporated by reference in its entirety.

Figure 9:
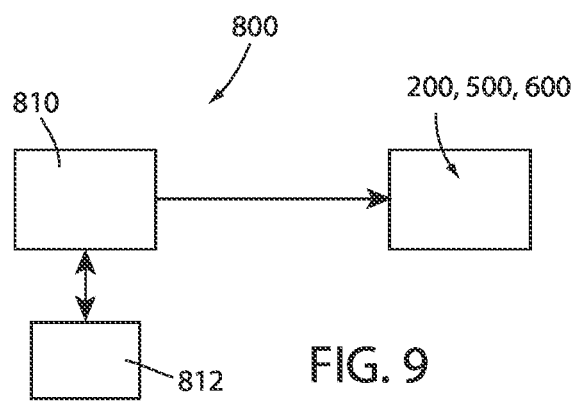
FIG. 9 is schematic drawing of an exemplary control system of the braking system.

Alternatively, in another embodiment, the braking system includes a control system 800, illustrated in FIG. 9. Control system 800 includes a microprocessor 810, which may include its own memory, a sensor 812, and a power supply, such as a battery. Further, control system 800 may include other microprocessors and/or other programmable electronics that are programmed to carry out the functions described herein, including a graphical user interface for creating and managing images at a display, descried below. It will be understood that control system 800 may also include other electronic components that are programmed to carry out the functions described herein, or that support the microprocessors and/or other electronics. The other electronic components include, but are not limited to, one or more field programmable gate arrays, systems on a chip, volatile or nonvolatile memory, discrete circuitry, integrated circuits, application specific integrated circuits (ASICs) and/or other hardware, software, or firmware, as would be known to one of ordinary skill in the art. Such components can be physically configured in any suitable manner, such as by mounting them to one or more circuit boards, or arranging them in other manners, whether combined into a single unit or distributed across multiple units. Further, some of these components may be physically distributed in different positions on patient support apparatus 10, or they may reside in a common location on the patient support apparatus 10. When physically distributed, the components may communicate using any suitable serial or parallel communication protocol, such as, but not limited to, CAN, LIN, Firewire, I-squared-C, RS-232, RS-485, etc.

Sensor 812 may provide a variety of functions. It should be understood that multiple sensors may be used to provide two or more or each of the functions noted below. In one embodiment, sensor 812 detects the presence of an object or person, and the control system actuates the braking system when the sensor detects the presence of the object or person, for example, to avoid a collision with the object or a person. For example, the sensor may comprise an ultrasonic sensor or an RFID reader, which reads a RFID tag worn by the person, such as a caregiver. For example, a suitable control system may include the control system disclosed in U.S. patent application Ser. No. 13/795,193, filed Mar. 12, 2013 entitled POWERED PATIENT SUPPORT APPARATUS, which is commonly owned by Stryker Corporation of Kalamazoo and which is incorporated by reference in its entirety herein.

In another embodiment, the sensor or sensors are mounted in the handles so that when a person releases one or both handles, the control system applies the brakes to slow or stop the apparatus.

In yet another embodiment, the sensor detects wheel speed so that the control system can selectively actuate the braking system based on input from the sensor such that the wheel braking may be synchronized to allow the apparatus to slow down or brake in a straight line, or may be modulated so that the operator can effectuate steering. In the latter case, additional input from the handles by way of other sensors provides input to the controller. The handle sensors generate signals based on a pressure or force applied to the handles. For example, if an operator wishes the apparatus to move to the right, the operator would typically apply a greater force to the left handle. If they wished to turn left, they would typically apply a greater force to the right handle. The controller may be configured to read the sensors signals to determine which way the operator wishes to turn and them modulate the braking accordingly to slow one wheel while allowing the other wheel to continue at the same speed, or to simply slow one wheel to a greater rate.

In another embodiment, the sensor comprises a switch on a pedal, which is monitored, to report to the control system whether the braking system 200 is currently in override mode. A sensor may also be provided to report a brake status to the control system, which is conveyed to the operator via one or more visual user interfaces, as described further below. In general, the brake status indicator(s) may help to avoid having the user inadvertently leave the patient support apparatus without the brakes being set.

As noted above, the control system cooperates with and controls the braking system to modulate the braking force applied by the braking system to the at least one auxiliary wheel of the patient support apparatus. In one embodiment, the braking system may include an on or off state, wherein the braking system has a normally brake-on state and is actuated to release the braking force or forces or has a normally unbraked state and is actuated to apply the braking force or forces.

It should be understood that patient support apparatus 10 may further comprise a supplemental braking system to selectively immobilize the patient support apparatus braking the caster wheels as well. One example of a suitable supplemental braking system is disclosed in detail in U.S. Pat. No. 7,690,059 issued Apr. 10, 2010 and titled HOSPITAL BED, the disclosure of which is hereby incorporated by reference herein in its entirety.

Figure 10:
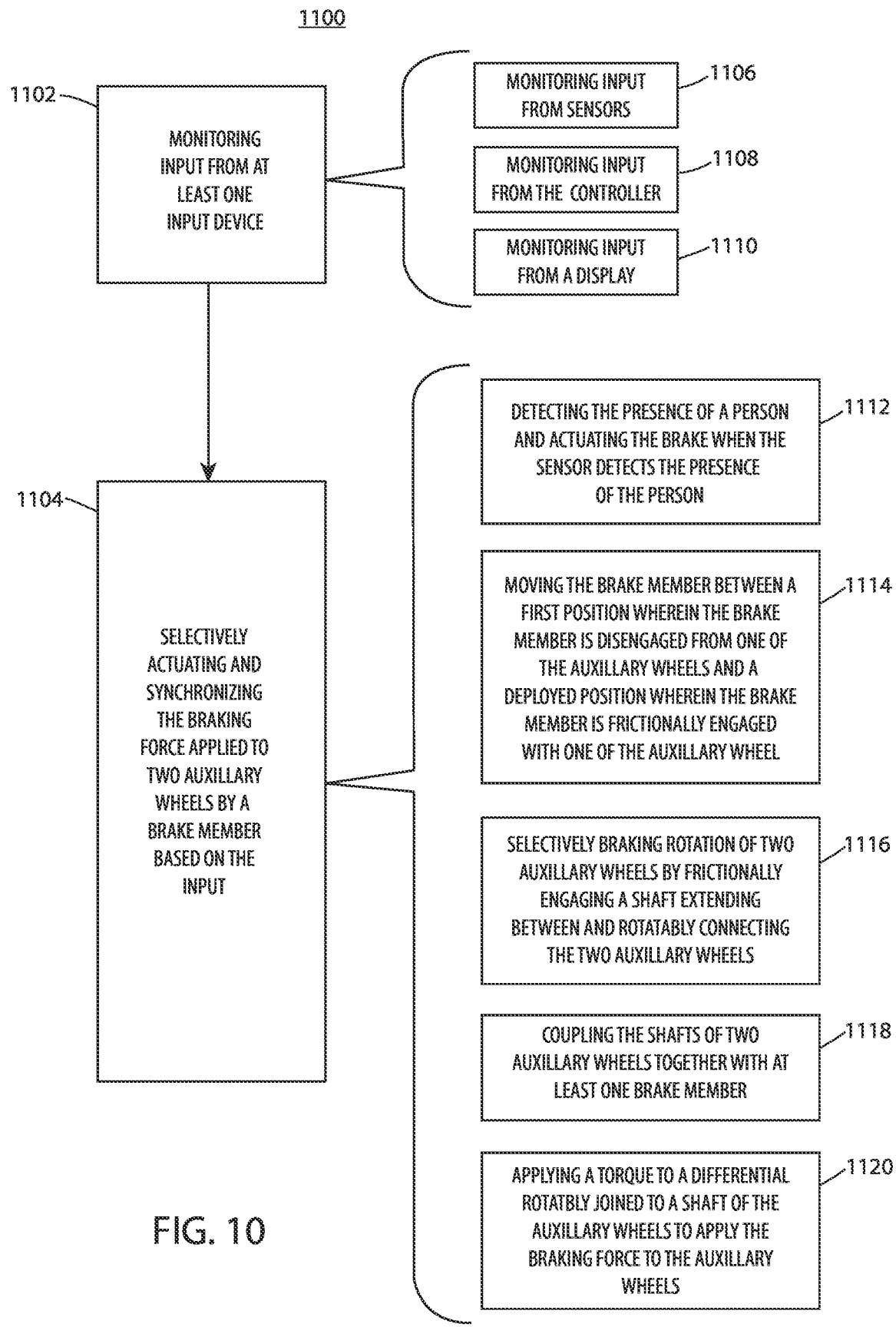
FIG. 10 is a flowchart of a method of braking a patient support apparatus.

Referring to FIG. 10, a method (1100) of controlling the braking of a patient support apparatus is described in greater detail. The patient support apparatus provided includes a base, a support structure secured to the base configured to rotatably support first and second auxiliary wheels, and a braking system having at least one brake member configured to apply a braking force to decelerate at least one of the auxiliary wheels. A controller is operatively connected to the at least one brake member and may be configured to modulate the braking force applied to the at least one auxiliary wheel.

The method includes monitoring (by the controller) input from at least one input device (1102). Based on the input, the method further includes selectively actuating and synchronizing the braking force applied to the auxiliary wheels by the at least one brake member (1104).

It is understood that the method may include actuating the at least one brake member in response to input from a variety of input devices, such as sensors (1106), including sensors connected to the handles of the patient support apparatus, or a display (1110), or based on control commands (1108) electrically communicated to the controller provided on the patient support apparatus.

It is understood that the method described above may include one or more additional steps.

In one embodiment, the step of selectively actuating the at least one brake member further comprises detecting presence of a person and actuating the at least one brake of the braking system when the sensor detects the presence of the person (1112).

In another embodiment, the step of selectively actuating the at least one brake member further comprises the step of moving the at least one brake member between a first position wherein the at least one brake member is disengaged from the auxiliary wheels and a deployed position wherein the at least one brake member is frictionally engaged with one of the auxiliary wheels to restrict rotation of the auxiliary wheels (1114).

In yet another embodiment, wherein the step of selectively braking includes frictionally engaging a shaft extending between and rotatably connecting two auxiliary wheels (first and second auxiliary wheels) (1116).

In another embodiment, wherein the step of selectively braking includes coupling the shafts of two auxiliary wheels (first and second auxiliary wheels) together with the at least one brake member (1118).

In yet another embodiment, wherein the step of selectively braking includes selectively applying a torque to a differential rotatably joined to a shaft of at least one of the auxiliary wheels to apply the braking force to the auxiliary wheels (1120).

We claim:

1. A patient support apparatus comprising:
   a base having a length and including a plurality of caster wheels enabling movement of the patient support apparatus across a floor surface;
   first and second non-castered auxiliary wheels;
   a braking system configured to apply a braking force to the first non-castered auxiliary wheel and/or the second non-castered auxiliary wheel; and
   a control system configured to (1) synchronize the braking force when a user desires to brake the patient support apparatus in a straight path and (2) modulate the braking force wherein one auxiliary wheel of the first and second non-castered auxiliary wheels is braked at a different speed than the other auxiliary wheel of the first and second non-castered auxiliary wheels when a user desires to steer the patient support apparatus in a non-straight path.

2. The patient support apparatus of claim 1, further comprising a sensor wherein the control system selectively actuates the braking system based on input from the sensor.

3. The patient support apparatus of claim 2, further comprising a handle operable by a user, wherein the sensor is located at the handle.

4. The patient support apparatus of claim 2, wherein the sensor detects the wheel speed of at least one of the auxiliary wheels.

5. The patient support apparatus of claim 1, further comprising a handle operable by a user to push or steer the patient support apparatus and a handle sensor located at the handle, the control system configured to (1) synchronize the braking force in response to signals from said handle sensor when a user wishes to brake the patient support apparatus and (2) modulate the braking force in response to signals from said handle sensor when a user desires to steer the patient support apparatus in a non-straight path.

6. The patient support apparatus of claim 2, wherein the sensor detects the presence of an object or person, and the control system actuating the braking system when the sensor detects the presence of the object or person to avoid a collision with the object or a person.

7. The patient support apparatus of claim 1, wherein the braking system includes at least one brake member, the brake member is movable between a deployed position wherein the brake member brakes at least one auxiliary wheel of the first and second non-castered auxiliary wheels is braked and a non-deployed position.

8. The patient support apparatus of claim 7, wherein the one auxiliary wheel of the first and second non-castered auxiliary wheels includes a disc, the brake member operable to frictionally engage the disc to thereby brake the one auxiliary wheel.

9. The patient support apparatus of claim 1, further comprising a drive mechanism configured to drive the first and second non-castered auxiliary wheels, the drive mechanism comprising a motor.

10. The patient support apparatus of claim 9, wherein the braking system uses back EMF from the motor to brake to the first non-castered auxiliary wheel and/or the second non-castered auxiliary wheel.

11. The patient support apparatus of claim 1, wherein the braking system includes a clutch, the control system controlling the clutch to synchronize the braking force applied to the first and second non-castered auxiliary wheels.

12. The patient support apparatus of claim 11, wherein the at least one brake member comprises a brake pad or a caliper to brake the one auxiliary wheel of the first and second non-castered auxiliary wheels, and the clutch selectively applies the braking force from the one auxiliary wheel of the first and second non-castered auxiliary wheels to the other auxiliary wheel of the first and second non-castered auxiliary wheels.

13. A method of braking or steering a patient support apparatus, the patient support apparatus having a plurality of front and rear bearings and first and second auxiliary wheels located between the front and rear bearings, said method comprising;
   applying a braking force to brake the first auxiliary wheel and/or the second auxiliary wheel;
   synchronizing the braking force when braking the patient support apparatus in a straight path; and
   modulating the braking force wherein one auxiliary wheel of the first and second auxiliary wheels is braked at a different speed than the other auxiliary wheel of the first and second auxiliary wheels when steering the patient support apparatus in a non-straight path.

14. The method of claim 13, further comprising monitoring input from a sensor, and synchronizing and/or modulating the braking force based on the input.

15. The method of claim 14, wherein said monitoring includes monitoring input from a plurality of sensors.

16. The method of claim 13, wherein the patient support apparatus includes a motor for driving the first and second auxiliary wheels, said applying the braking force includes using back EMF from the motor to apply the braking force.

17. The method of claim 13, wherein the first and second auxiliary wheels are each mounted about a shaft, further comprising a differential joining the shafts, said applying the braking force includes applying a torque to the differential to apply the braking force to the first and second auxiliary wheels.

* * * * *